United States Patent
Doi et al.

(10) Patent No.: US 7,380,097 B2
(45) Date of Patent: May 27, 2008

(54) APPARATUS AND METHOD FOR CONTROLLING ADDRESS CONVERSION BUFFER

(75) Inventors: Masanori Doi, Kawasaki (JP); Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 458 days.

(21) Appl. No.: 10/986,041

(22) Filed: Nov. 12, 2004

(65) Prior Publication Data
US 2006/0026380 A1    Feb. 2, 2006

(30) Foreign Application Priority Data
Jul. 27, 2004   (JP)   ............... 2004-219234

(51) Int. Cl.
*G06F 12/10*   (2006.01)
(52) U.S. Cl. ............... 711/207; 711/209; 718/108
(58) Field of Classification Search ............... None
See application file for complete search history.

(56) References Cited

U.S. PATENT DOCUMENTS 4,727,482 A * 2/1988 Roshon-Larsen et al. ... 711/202
5,640,533 A    6/1997  Hays et al.
6,718,494 B1   4/2004  Jamil et al.
2003/0191927 A1 10/2003 Joy et al.

FOREIGN PATENT DOCUMENTS

| JP | 3-22057 | 1/1991 |
|---|---|---|
| JP | 06-259329 | 9/1994 |

\* cited by examiner

*Primary Examiner*—Gary Portka
(74) *Attorney, Agent, or Firm*—Staas & Halsey LLP

(57) ABSTRACT

A method for controlling an address conversion buffer, constituted on a processor capable of executing a plurality of threads simultaneously on one core, includes registering address conversion information in an entry of the address conversion buffer that includes a first memory area usable by one of the threads and a second memory area shared among all the threads, allocating a part of the second memory area as a swap area of the first memory area, and transferring data in the swap area to the first memory area, based on thread switching executed by the processor.

20 Claims, 11 Drawing Sheets

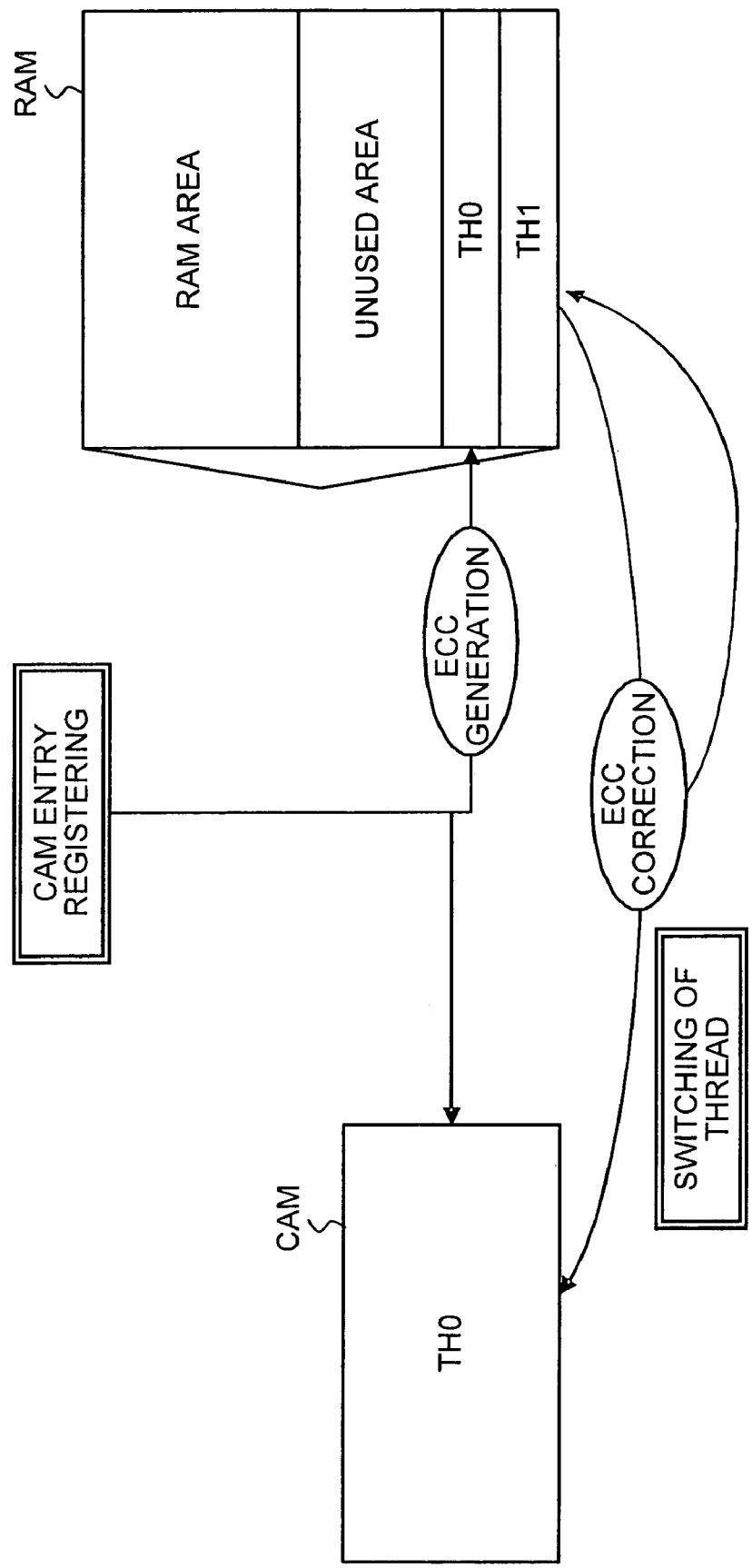

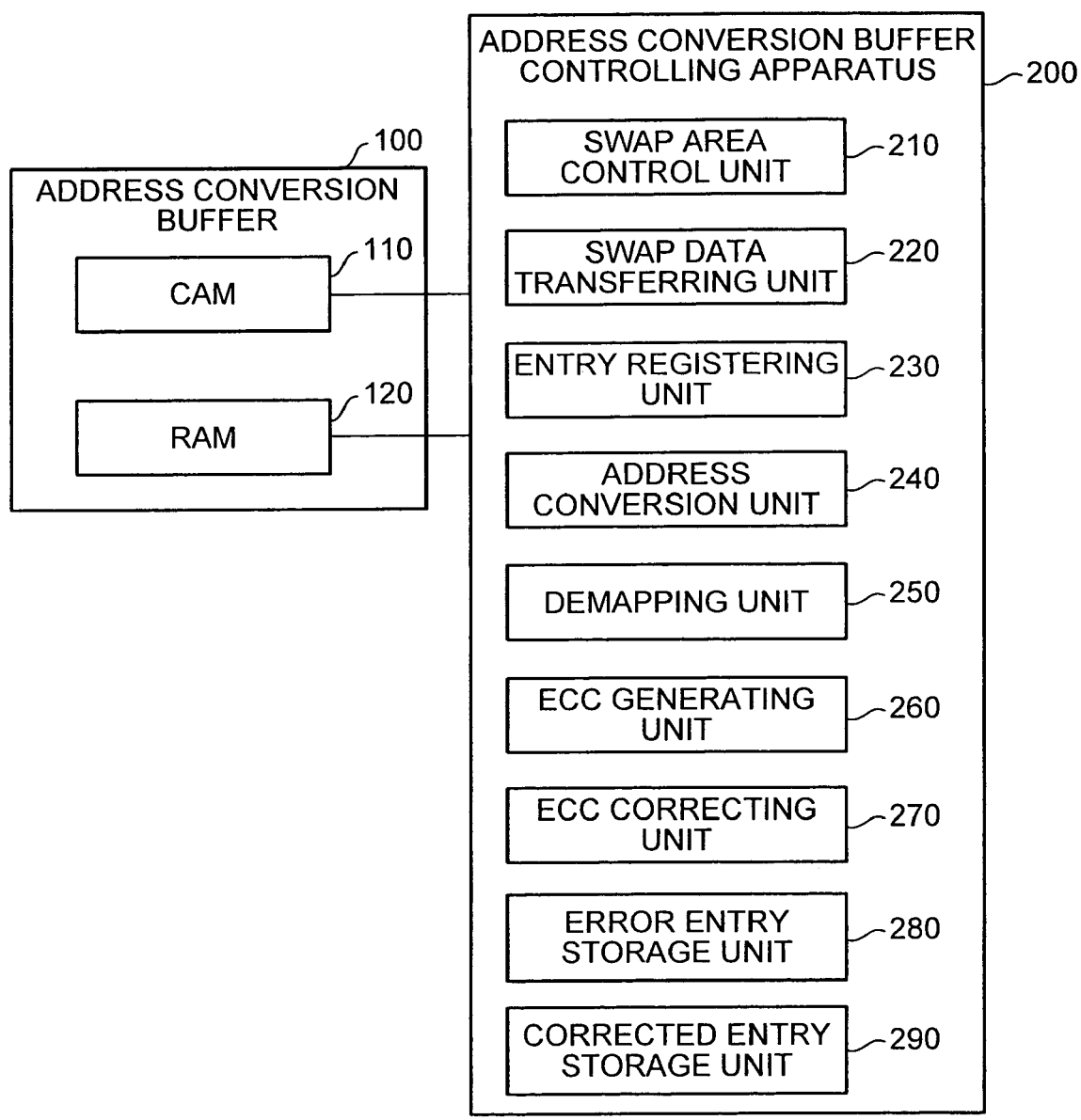

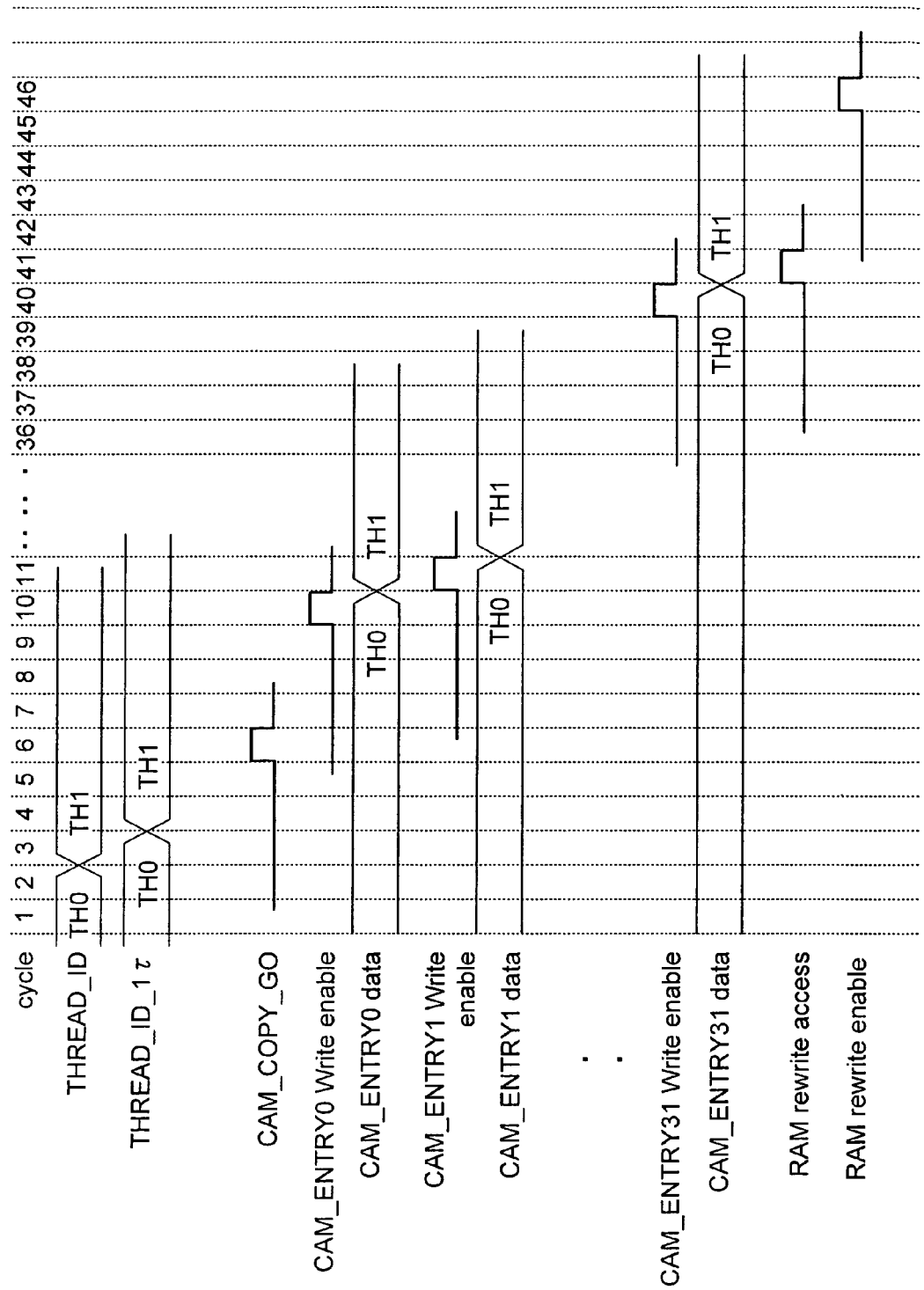

APPARATUS AND METHOD FOR CONTROLLING ADDRESS CONVERSION BUFFER

BACKGROUND OF THE INVENTION

1) Field of the Invention

The present invention relates to an apparatus and a method for controlling an address conversion buffer, such that a processor can execute a plurality of threads simultaneously on one core without increasing a capacity of the address conversion buffer.

2) Description of the Related Art

Computer systems adopting a virtual storage method use a conversion table known as a page table, to convert a virtual address into a physical address. The page table is normally stored in a main memory, but because the speed of accessing the main memory is low with respect to an operation of a CPU (Central Processing Unit). Therefore, if the page table in the main memory is referred to for every address conversion, the performance of the systems deteriorates.

Japanese Patent Application Laid-open Publication No. H6-259329 discloses a method in which an address conversion buffer called Translation Lookaside Buffer (TLB) is provided in the CPU, and a history of address conversion is cached therein, so that the access to the page table in the main memory is reduced as much as possible.

In recent years, the capacity of TLB has increased with an increase in an address space used by programs. This is because the small capacity of TLB causes many TLB malfunctions, and thus the performance of the systems deteriorates. Although a CPU adopting a multi-thread architecture that can execute a plurality of threads simultaneously on one processor core has been generally used, it is necessary to retain the history of the address conversion for the threads in the CPU compatible with the multi-threading. Hence, the necessary capacity of TLB further increases.

However, to increase the capacity of the TLB, the packaging area of the TLB must be large, and this causes difficulty in CPU production, and the cost increases. Particularly in CPUs adopting the multithread architecture, resources cannot be shared among threads, and thus, it is difficult to allocate a large packaging area to the TLB.

SUMMARY OF THE INVENTION

It is an object of the invention to at least solve the problems in the conventional technology.

An address conversion buffer controlling apparatus according to an aspect of the present invention is constituted on a processor capable of executing a plurality of threads simultaneously on one core. The address conversion buffer controlling apparatus includes an address conversion buffer that is controlled by the address conversion buffer controlling apparatus, and that includes a first memory area usable by one of the threads and a second memory area shared among all the threads; an entry registering unit that registers address conversion information in an entry of the address conversion buffer; a swap area control unit that provides control to allocate a part of the second memory area as a swap area of the first memory area; and a swap data transferring unit that transfers data in the swap area to the first memory area, based on thread switching executed by the processor.

A method for controlling an address conversion buffer apparatus according to another aspect of the present invention constituted on a processor capable of executing a plurality of threads simultaneously on one core. The method includes registering address conversion information in an entry of an address conversion buffer, which is controlled by an address conversion buffer controlling apparatus, and which includes a first memory area usable by one of the threads and a second memory area shared among all the threads; allocating a part of the second memory area as a swap area of the first memory area; and transferring data in the swap area to the first memory area, based on thread switching executed by the processor.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 illustrates error control in the method for controlling the address conversion buffer;

FIG. 3 is a functional block diagram of an address conversion buffer controlling apparatus;

FIG. 12 is a time chart for explaining the swap data transferring process.

DETAILED DESCRIPTION

Exemplary embodiments of an apparatus and a method for controlling an address conversion buffer according to the present invention will be explained in detail below, with reference to the accompanying drawings. An example of a processor, which has a CAM (Content Addressable Memory) as a memory area of TLB not shared among threads, and a RAM (Random Access Memory) as a memory area of TLB shared among the threads, is explained.

Figure 1:
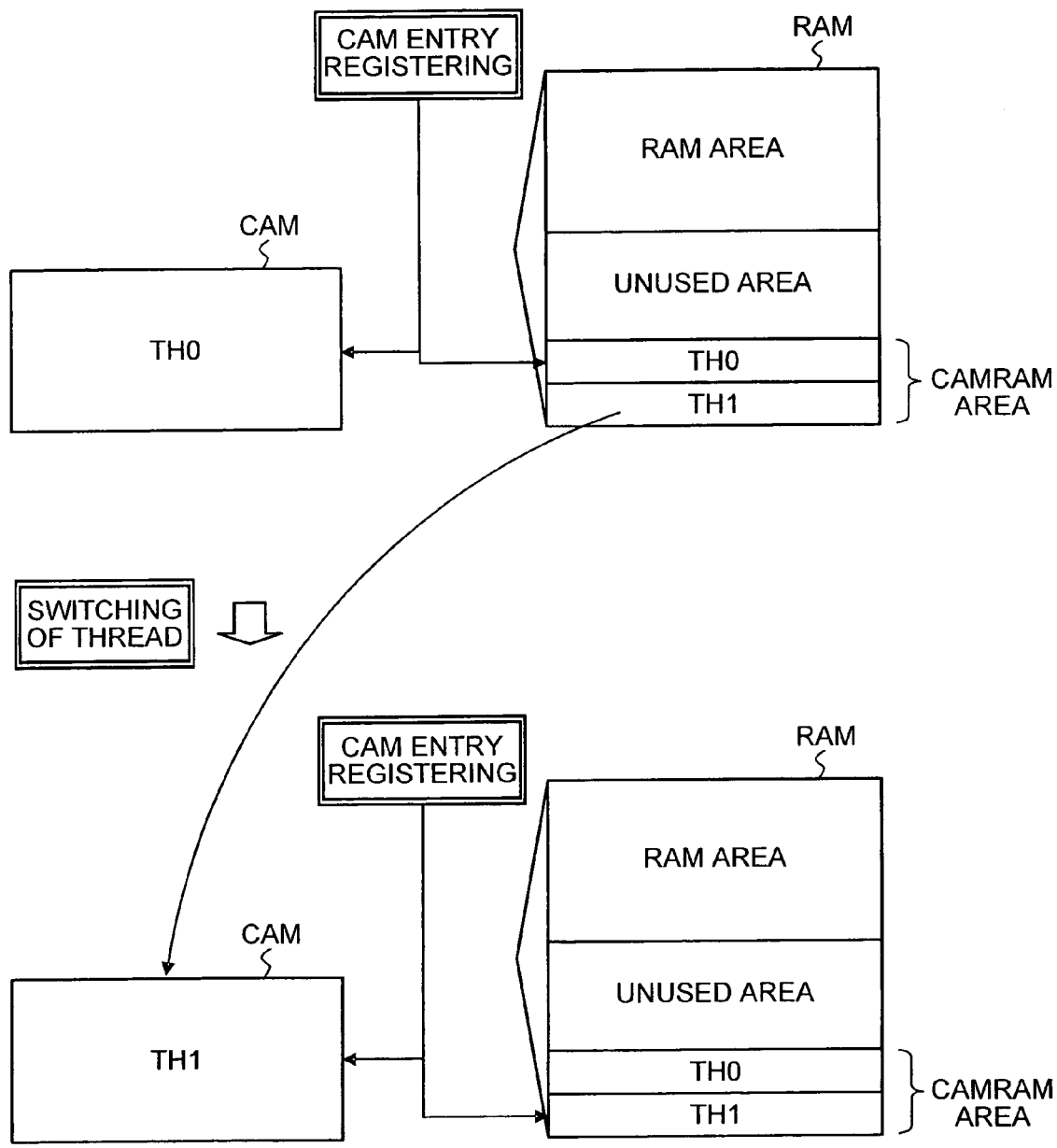
FIG. 1 illustrates a principle of a method for controlling an address conversion buffer according to one embodiment.

The principle of a method for controlling an address conversion buffer according to the embodiment is explained below. FIG. 1 is an explanatory diagram of the principle of the method for controlling an address conversion buffer according to the embodiment.

As shown in FIG. 1, TLB of a processor adopting multithread architecture, to which the method for controlling the address conversion buffer of the embodiment is applied, has a memory area called as the CAM and a memory area called as the RAM.

The CAM is a memory area having a constitution capable of carrying out address conversion at a high speed, and information of various page sizes can be registered therein. The CAM is created on a latch base, and thus, error such as data inversion hardly occurs. Accordingly, information about lock entry, global bit, or the like that is important for the operation of the system is also stored in CAM. However, the storage area of the CAM is small with respect to a packaging area, and thus, a large amount of information cannot be stored therein.

In the RAM, the time required for address conversion becomes longer than that in the CAM, and a storable page size is limited to one, but the storage area of the RAM is large with respect to the packaging area. Due to a high ratio of the storage area to the packaging area, the area in the RAM can easily be expanded corresponding to the number of threads simultaneously executed on a processor. On the contrary, the expansion of the area in the CAM is difficult.

Therefore, in the method for controlling the address conversion buffer of the embodiment, a part of the RAM is allocated as a swap area for the CAM, and information in the swap area is transferred to the CAM every time of switching the thread. The RAM is set as swapping destination for the CAM data, because the capacity of the RAM is comparatively large, and moreover, because the RAM and the CAM both are present on the processor, so that data can be transferred at a high speed.

The processor adopting the multithread architecture has two methods. In a SMT (Simultaneous Multi Thread) method, a plurality of threads are actually operated on one core. In a VMT (Vertical Multi Thread) method, a thread can be switched frequently at a remarkably higher speed than that of a normal processor, but only one thread is actually operated at one point of time.

In the processor adopting the VMT type multithread architecture, because only one thread is operated, a method in which contents of CAM are rewritten based on the switching of the thread like the method for controlling the address conversion buffer of the embodiment, can be applied effectively to the processor.

In the method for controlling the address conversion buffer of the embodiment, as shown in FIG. 1, swap areas in the CAM (hereinafter, "CAMRAM") according to the number of threads operated on the processor are reserved in a part of RAM. While a thread 0 is being operated on the processor, information corresponding to the thread 0 is stored in the CAM. When a new entry is registered in the CAM, the same entry is registered also in an area in the CAMRAM corresponding to the thread 0.

By providing a control so that the contents in the CAM match with the contents in the CAMRAM, it is not necessary to swap the contents in the CAM to the CAMRAM at the time of switching the thread. Therefore, a process involved in the switching of the thread can be executed at a high speed.

When the thread that operates on the processor is switched from the thread 0 to a thread 1, the contents in an area of the CAMRAM corresponding to the thread 1 are transferred to the CAM. When the contents in the CAM-RAM are transferred to the CAM according to the switching of the thread, information corresponding to the thread operating on the processor is always stored in the CAM. Therefore, the processor can cope with multi-threading without increasing the number and the capacity of the CAM.

As described above, the CAM is frequently created on a latch base, and thus an error such as data inversion hardly occurs, but the RAM does not have such a characteristic. Because the CAM stores important data, which causes serious faults such as a system down just after garbled data is generated, swapping the data in CAM to the RAM is very unreliable.

Therefore, in the method for controlling the address conversion buffer of the embodiment, an error control is made on the data swapped in RAM. FIG. 2 is an explanatory diagram of the error control in the method for controlling the address conversion buffer of the embodiment.

As shown in FIG. 2, when a new entry is registered in the CAMRAM, an ECC (Error Correcting Code) bit that allows garbled data to be detected and corrected is added to the new entry, and the entry is registered. When the contents in the CAMRAM are transferred to the CAM according to the switching of thread, the ECC bit is used to detect and correct garbled data.

Adding the ECC bit increases the reliability of the CAM data, and prevents the occurrence of a system failure.

A constitution of an address conversion buffer controlling apparatus according to the embodiment is explained below. FIG. 3 is a functional block diagram of the address conversion buffer controlling apparatus according to the embodiment. An address conversion buffer controlling apparatus 200 is connected to an address conversion buffer 100.

The address conversion buffer 100 stores conversion history of a virtual address, and has two memory areas, a CAM 110 and a RAM 120. The CAM 110 is a memory area whose capacity is comparatively small, and can store information for only one thread. The RAM 120 is a memory area whose capacity is comparatively large, and can store information based on the number of threads operable on the processor.

The address conversion buffer controlling apparatus 200 controls the address conversion buffer 100, and includes a swap area control unit 210, a swap data transferring unit 220, an entry registering unit 230, an address conversion unit 240, a demapping unit 250, an ECC generating unit 260, an ECC correcting unit 270, an error entry storage unit 280, and a corrected entry storage unit 290.

The swap area control unit 210 reserves an area in the RAM 120, to store the information in the CAM 110 according to the number of threads executable on the processor. When the swap area control unit 210 operates in a mode that the processor executes only one thread, the swap area for the CAM data is not reserved in the RAM 120, but the entire area of the RAM 120 can be used as a storage area for the RAM data.

The operation of the processor in a multithread mode is controlled by highest-order bit of an access address, and the highest-order bit is fixed to 0 at the time of the multithread operation.

The swap data transferring unit 220 detects the switching of a thread, and transfers the CAM data corresponding to a new thread from the RAM 120 to the CAM 110. The swap data transferring unit 220 detects garbled data using the ECC bit at the time of the transfer, and if garbled data is found, executes a correcting process.

The entry registering unit 230 registers new address conversion information in the address conversion buffer 100. When the registering destination is the CAM 110, the address conversion information with the ECC bit added, is also registered in the CAMRAM area of the RAM 120.

The address conversion unit 240 refers to the address conversion buffer 100, and converts a virtual address into a physical address. The demapping unit 250 deletes unnecessary address conversion information from the address conversion buffer 100.

The ECC generating unit 260 generates the ECC bit of the address conversion information to be registered in the CAM-RAM area. The ECC correcting unit 270 detects and corrects garbled data of the address conversion information, using the ECC bit.

The error entry storage unit 280 stores information of an entry in which garbled data is detected at the time of transferring the CAM data from the RAM 120 to the CAM 110. The corrected entry storage unit 290 stores the entry information corrected using the information in the error entry storage unit 280.

A method in which the swap data transferring unit 220 corrects data in CAMRAM using the error entry storage unit 280 and the corrected entry storage unit 290, is explained next. For simplifying the explanation, the error entry storage unit 280 and the corrected entry storage unit 290 each are assumed to store one piece of entry information therein, but actually these storage units can store a plurality of entries.

Figure 4A:
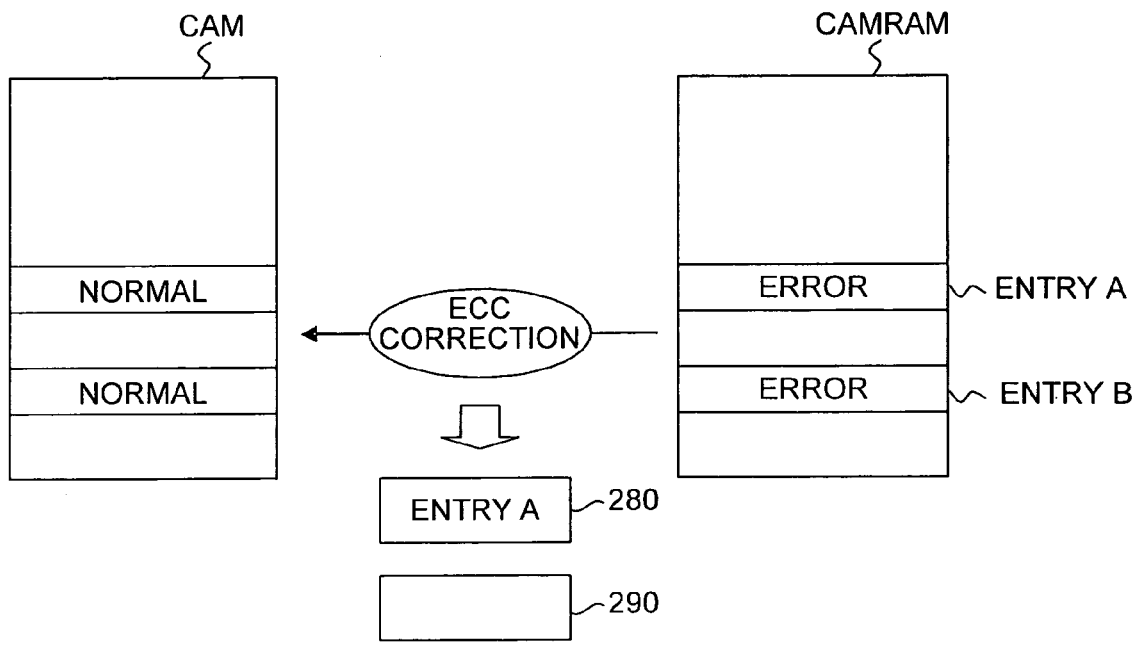
FIG. 4A is an explanatory diagram of error correction using an error entry storage unit and a corrected entry storage unit.

FIGS. 4A to 4D are explanatory diagrams of error correction using the error entry storage unit 280 and the corrected entry storage unit 290. As shown in FIG. 4A, garbled data is generated in two entries in the CAMRAM, and areas including these entries are transferred to the CAM 110 during the thread switching.

The garbled data of the entry A and the entry B is corrected using the ECC bit at the time of the transfer, and stored in predetermined entries in the CAM 110. Even if any garbled data is generated in an entry of the CAMRAM, the garbled data is corrected into a proper value at the time of the transfer, to the entry of the CAM 110.

However, the next time that the same areas are transferred to the CAM 110, it is necessary to correct the garbled data again. Thus, it is preferable to correct the entry A and the entry B in the CAMRAM also. At the same time, when the corrected address conversion information is set in the entry of the CAM 110, the same value can be set also in the CAMRAM. This, however, possibly increases the time required for the switching of the thread.

In the method for controlling the address conversion buffer according to the embodiment, after the entire information in the CAMRAM is transferred to the CAM 110, garbled data in the CAMRAM is corrected. Therefore, the error entry storage unit 280 is provided so as to store the entry information in the CAMRAM in which garbled data is detected during the transfer to the CAM 110.

In FIG. 4A, two entries with error occurs are present, but because the error entry storage unit 280 can retain only one piece of entry information, the information in the entry A in which garbled data is detected first, is stored in the error entry storage unit 280.

Figure 4B:
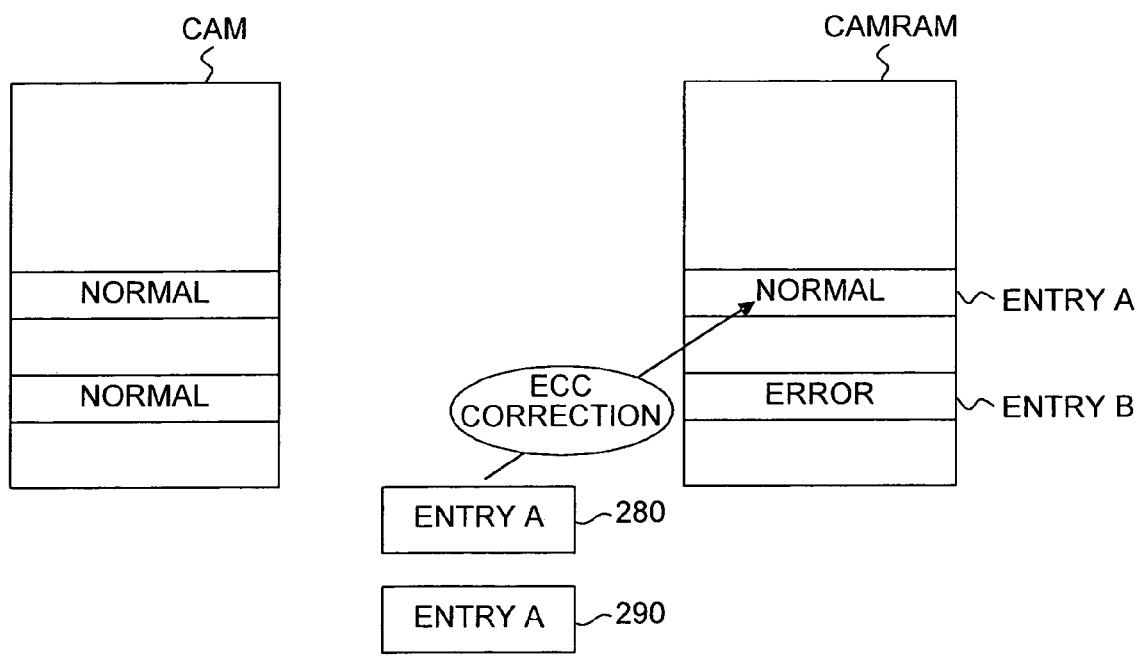
FIG. 4B is an explanatory diagram of the error correction using the error entry storage unit and the corrected entry storage unit.

FIG. 4B is a diagram of a state after the transfer of CAM data to the CAM 110 is complete. The address conversion buffer controlling apparatus 200 corrects the garbled data of the entry A in the CAMRAM based on the information in the error entry storage unit 280.

In this example, because the error entry storage unit 280 can retain only one piece of entry information, only the entry A in the CAMRAM stored in the error entry storage unit 280 is corrected. The entry B is not corrected at this point, but is corrected the entry B is transcribed to the CAM 110 at the next switching of the thread.

However, if the entry A has a fixed failure and the garbled data is generated every time, the entry B does not get an opportunity to correct the garbled data. Therefore, in the method for controlling the address conversion buffer according to the embodiment, the corrected entry storage unit 290 is provided, to store the information of the entry in the CAMRAM in which the garbled data is corrected.

If the garbled data is generated again in the entry registered in the corrected entry storage unit 290, this entry possibly has a fixed failure. Therefore, information of another entry in which garbled data is corrected should be stored in the error entry storage unit 280 by priority. Therefore, on detecting the garbled data during the transfer from the CAM RAM to the CAM 110, if the error entry storage unit 280 is already occupied, the information in which the same entry is present in the corrected entry storage unit 290 may be overwritten with a new one.

In FIG. 4B, after the garbled data of the entry A are corrected based on the information in the error entry storage unit 280, the information of the entry A is stored in the corrected entry storage unit 290.

Figure 4C:
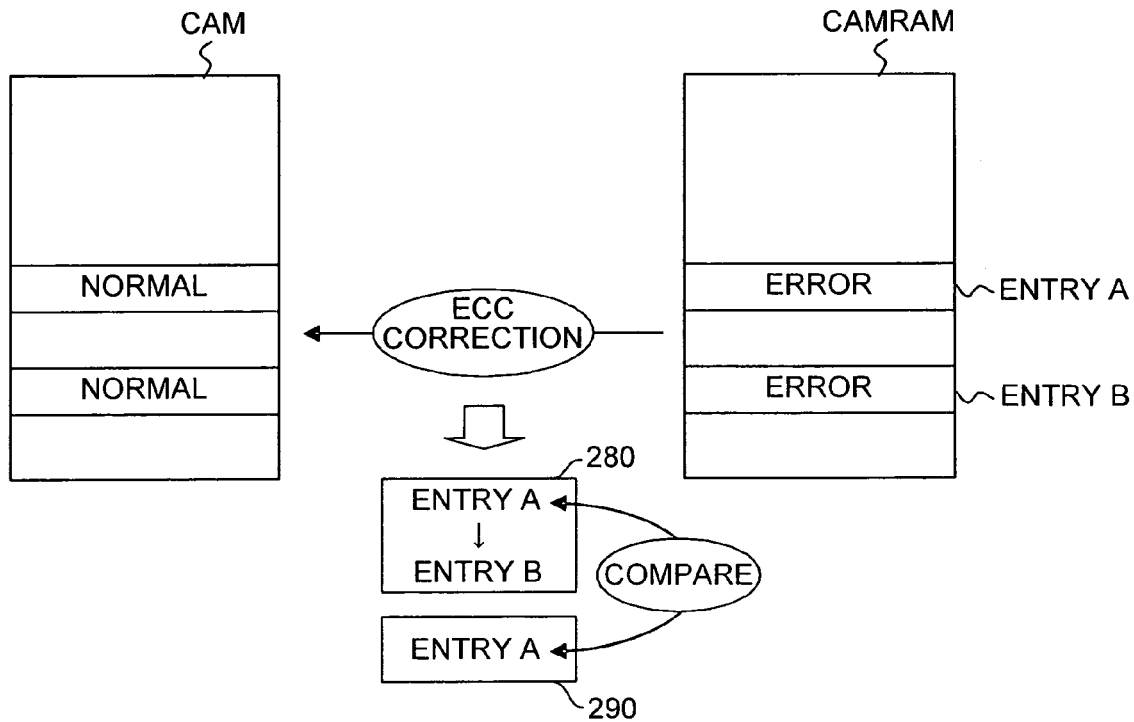
FIG. 4C is an explanatory diagram of the error correction using the error entry storage unit and the corrected entry storage unit.

FIG. 4C is a diagram of a state that the areas including the entries A and B in the CAMRAM are again transferred to the CAM 110. In this example, because the data in the entry A is garbled again, and the contents of the entry B are not corrected, the data remains garbled.

The information of the entry A is once stored in the error entry storage unit 280, but at the time when the address conversion information of the entry B is transferred to the CAM 110 and garbled data is detected, the information of the entry A is overwritten with the information of the entry B. This is because the information of the entry A stored in the error entry storage unit 280 is present in the corrected entry storage unit 290.

Figure 4D:
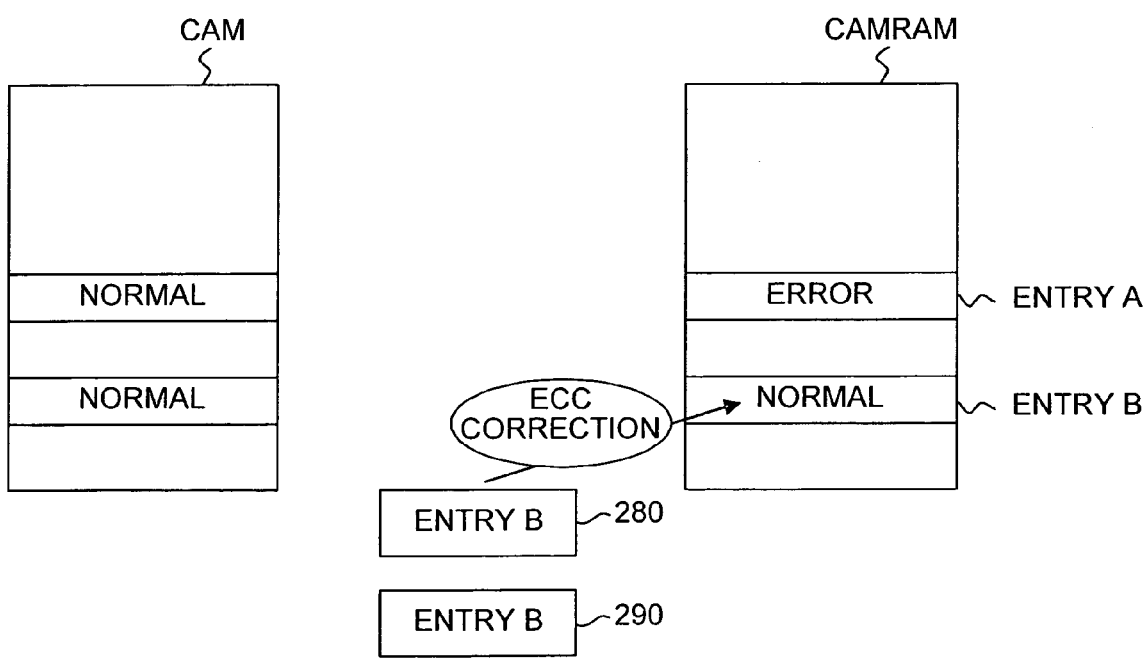
FIG. 4D is an explanatory diagram of the error correction using the error entry storage unit and the corrected entry storage unit.

FIG. 4D is a diagram of a state after the transfer of the CAM data to the CAM 110 is complete. As shown in FIG. 4D, the address conversion buffer controlling apparatus 200 corrects garbled data of the entry B in the CAMRAM based on the information in the error entry storage unit 280.

When the error entry storage unit 280 is provided, after the data transfer process based on the switching of thread is completed quickly, the garbled data in the CAMRAM can be corrected. When the corrected entry storage unit 290 is provided, garbled data of another entry in CAMRAM can be corrected in preference to an entry having a fixed failure.

Figure 5:
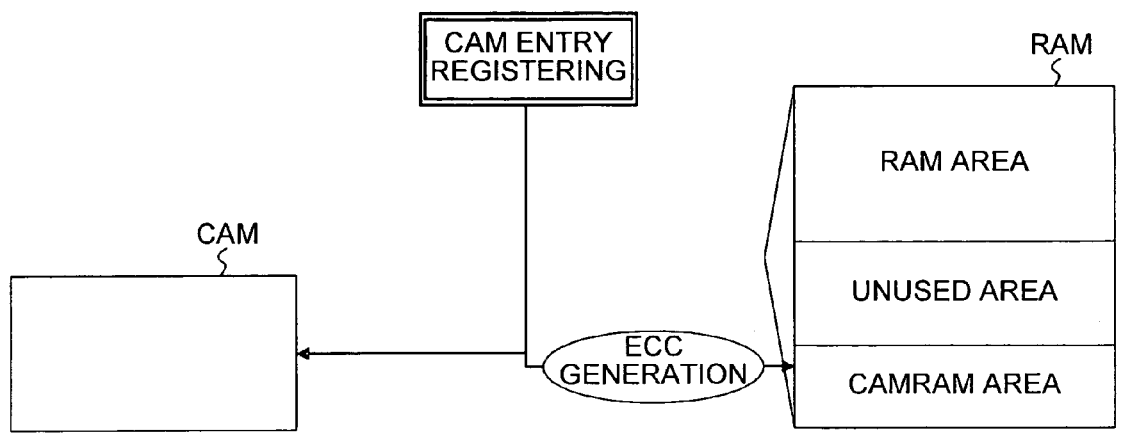
FIG. 5 is an explanatory diagram of entry registering performed by the address conversion buffer controlling apparatus.

Various operations of the address conversion buffer controlling apparatus according to the embodiment are explained below. The operation for registering entries is explained first. FIG. 5 is an explanatory diagram of the entry registering performed by the address conversion buffer controlling apparatus 200 shown in FIG. 3.

As shown FIG. 5, when address conversion information is registered in the CAM 110, the same information is registered in an area, corresponding to a thread being currently executed, in the CAMRAM area of the RAM 120. At this time, ECC bit for detecting and correcting garbled data is added to the information.

The same information is registered also in the CAMRAM area besides the CAM 110, so that the information in the CAMRAM is always updated. This means that an operation for swapping the information in the CAM 110 into the CAMRAM is not necessary at the time of the switching of thread, and contributes to high-speed switching of thread.

Figure 6:
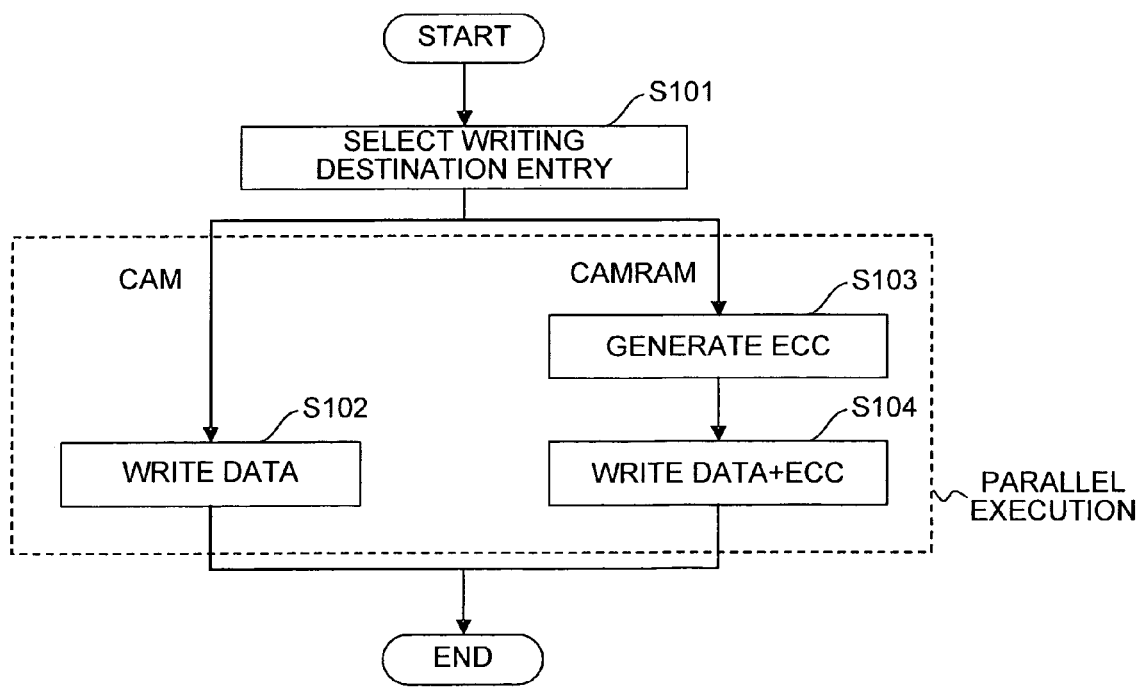
FIG. 6 is a flowchart of a procedure of the entry registering process.

FIG. 6 is a flowchart of the procedure of the entry registering process.

As shown in FIG. 6, when it is necessary to register the address conversion information in the CAM 110, LRU (Least Recently Used) information or the like in the CAM 110 is referred to, and an entry of writing destination is selected (step S101).

When the entry of the writing destination is determined, address conversion information is written into the CAM 110 (step S102). Simultaneously, the ECC bit is generated (step S103), and the address conversion information to which the ECC bit is added is written into the CAMRAM (step S104).

Figure 7:
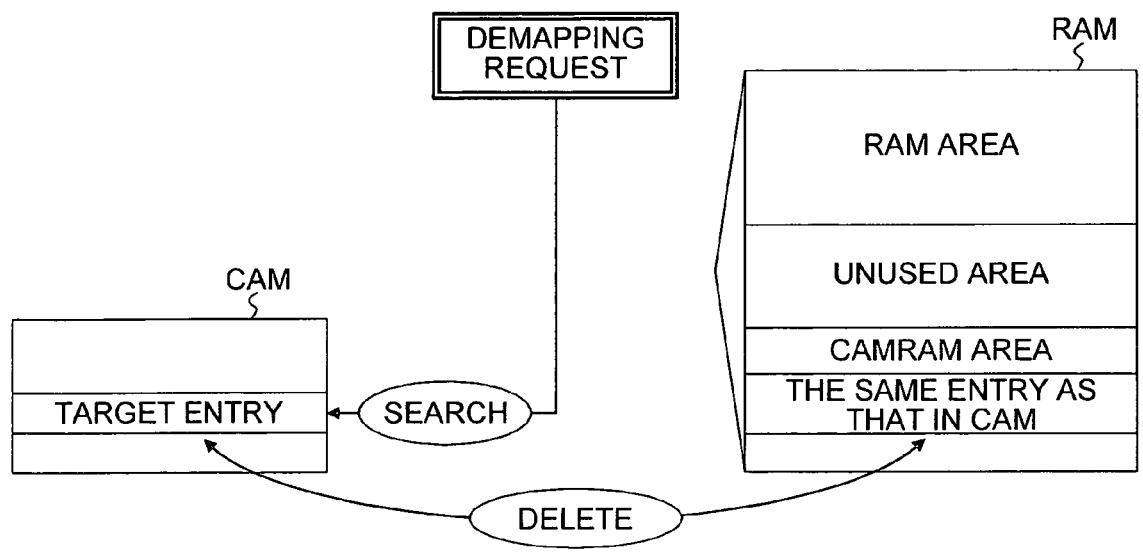
FIG. 7 is an explanatory diagram of demapping performed by the address conversion buffer controlling apparatus.

The demapping operation is explained below. FIG. 7 is an explanatory diagram of demapping performed by the address conversion buffer controlling apparatus 200 shown in FIG. 3.

When it is necessary to delete the address conversion information from the CAM 110, a corresponding entry is searched from the CAM 110, and the entry in the CAM 110 and the corresponding entry in the CAMRAM are deleted simultaneously.

By deleting the information in the CAMRAM area and the information in the CAM 110 simultaneously, the information in the CAMRAM is always updated. This means that the operation for swapping the information in the CAM 110 into the CAMRAM is not necessary at the time of the switching of thread, and contributes to the high-speed switching of thread.

Figure 8:
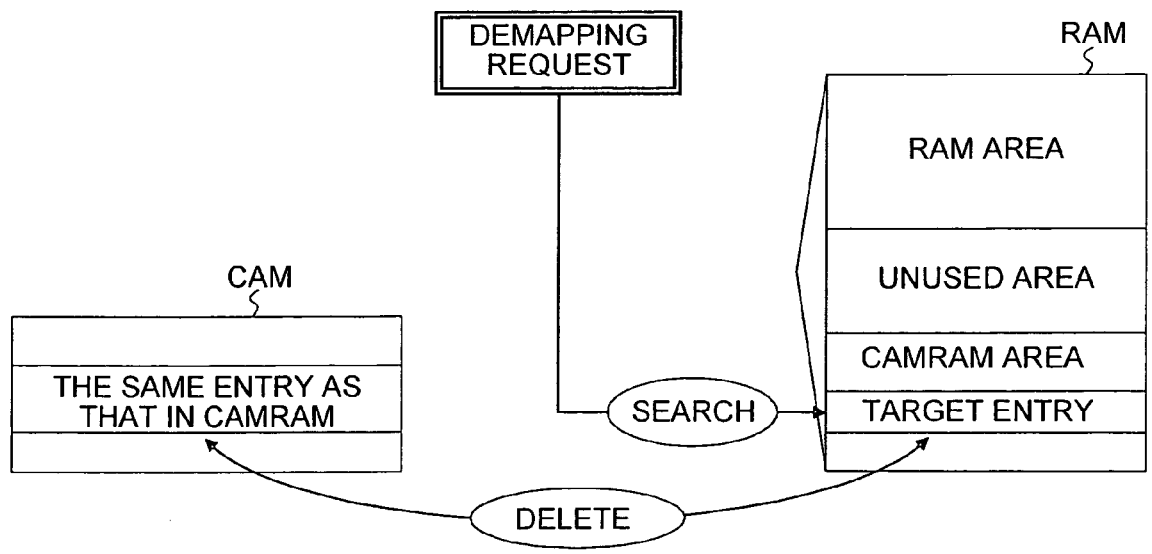
FIG. 8 is an explanatory diagram of the demapping, where the CAMRAM entry is searched.

Alternative to the above process, because the information in the CAM 110 is identical to the corresponding information in the CAMRAM, the entry to be deleted may be searched from the CAMRAM at the time of demapping. FIG. 8 is an explanatory diagram of the demapping where the CAMRAM entry is searched. This procedure produces the same effect as that in FIG. 7.

Figure 9:
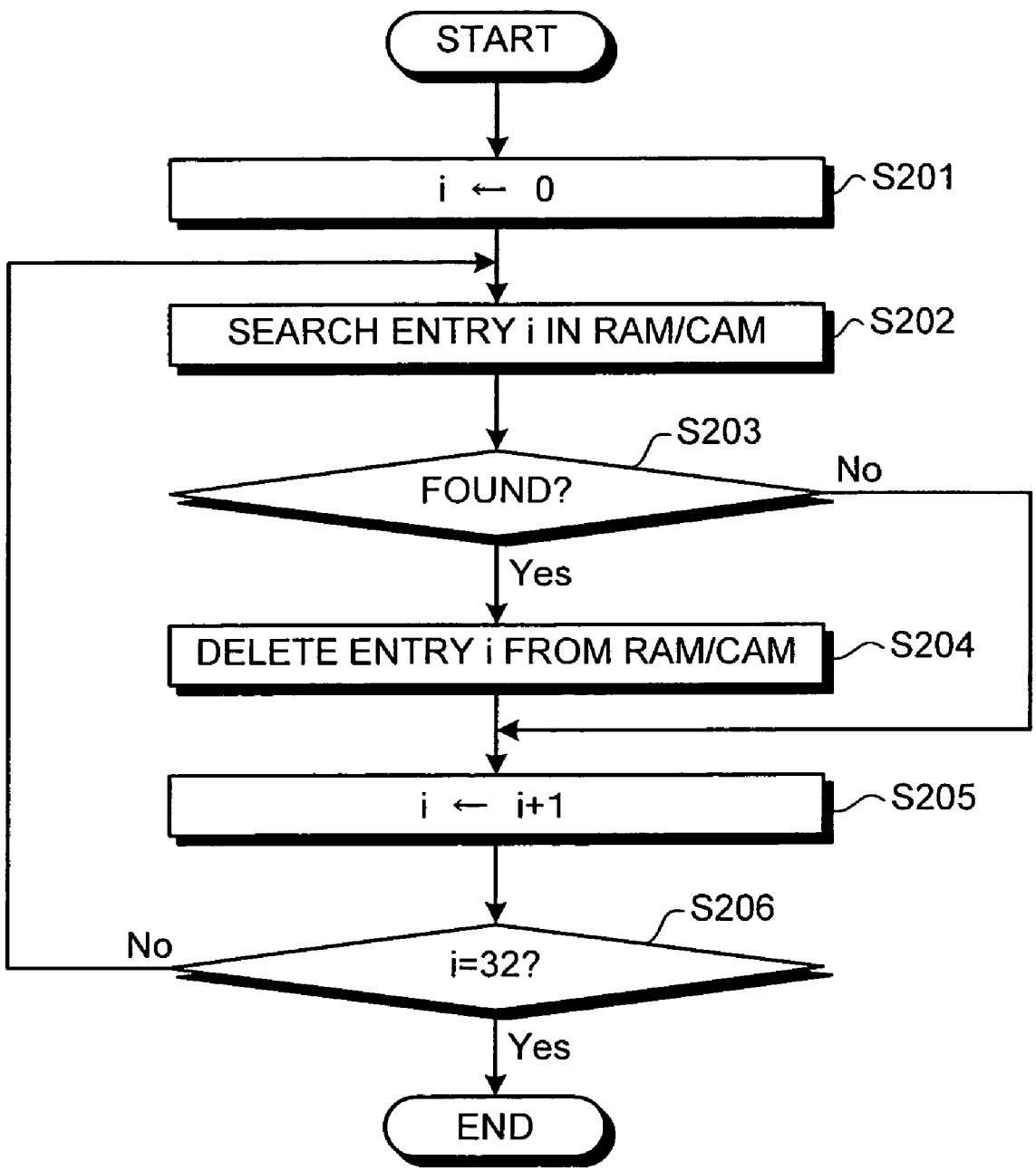
FIG. 9 is a flowchart of a procedure of the demapping process.

FIG. 9 is a flowchart of the procedure of the demapping process. Here, an example with 32 entries present in the CAM 110 is explained, but in the address conversion buffer controlling apparatus and the method for controlling the address conversion buffer according to the present invention, any number of entries may be present in the CAM 110.

As shown in FIG. 9, a counter is initialized to 0 (step S201). An entry in the CAM 110 (or CAMRAM) represented by the counter is searched (step S202). If the entry is the entry to be deleted (Yes at step S203), the entries in the CAM 110 and in the CAMRAM represented by the counter are deleted (step S204). If the entry is not the one to be deleted (No at step S204), no particular process is executed.

The counter is incremented (step S205), and if the counter is not equal to 32 (No at step S206), the process is repeated from step S202. If the counter is equal to 32 (Yes at step S206), the process ends.

Figure 10:
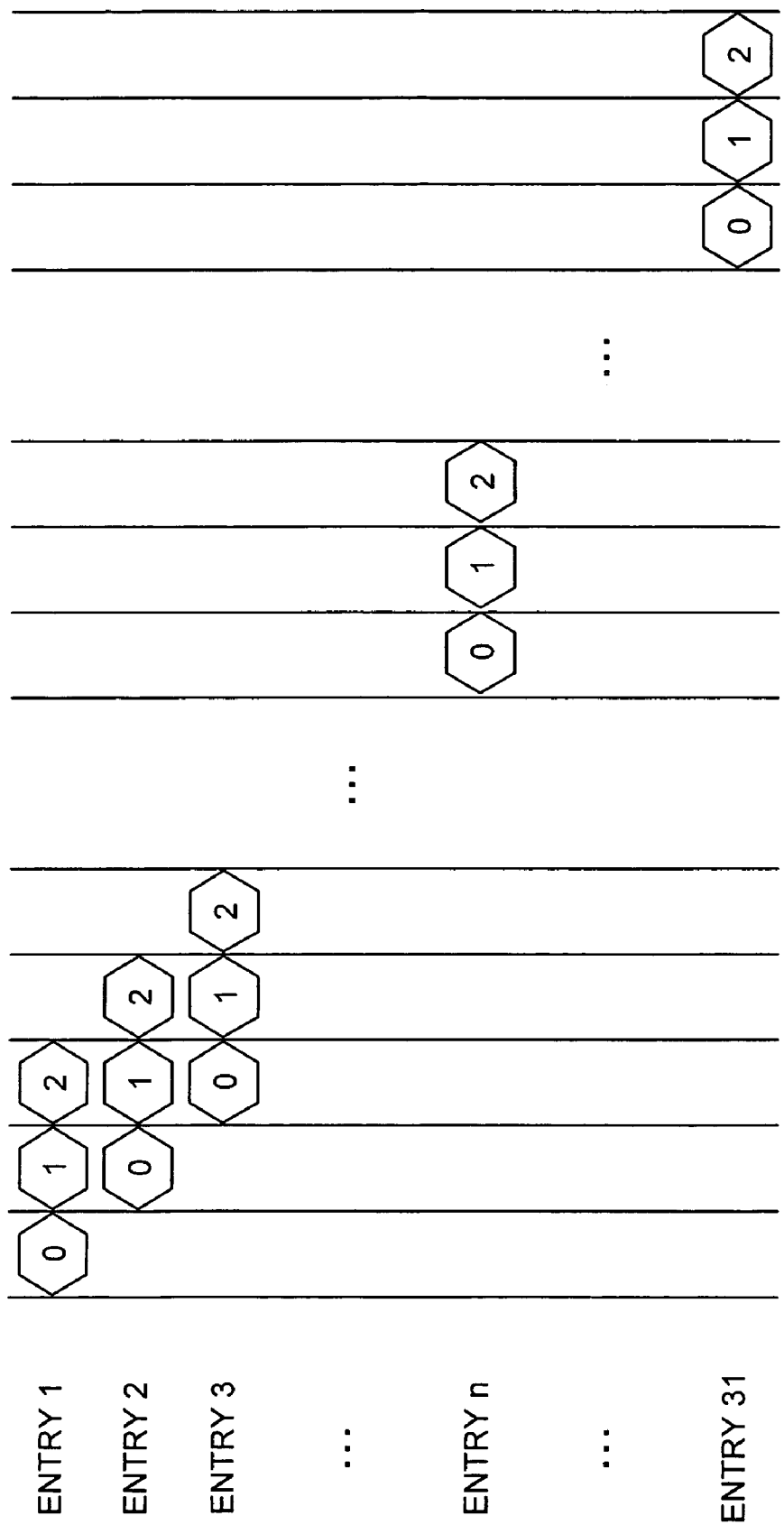
FIG. 10 is an explanatory diagram of a pipeline process of the demapping.

The time required for the demapping process shown in the flowchart can be shortened by using a pipeline. FIG. 10 is an explanatory diagram of a pipeline process of the demapping.

As shown in FIG. 10, the demapping process for one entry can be divided into three cycles. The first cycle (the cycle represented by 0 in FIG. 10) is a process for searching a target entry and corresponds to step S202 of FIG. 9.

The second cycle (the cycle represented by 1 in FIG. 10) is a process for checking by comparison whether an entry is the one to be deleted, and corresponds to step S203 of FIG. 9.

The third cycle (the cycle represented by 2 in FIG. 10) is executed when an entry is determined as the one to be deleted at the second cycle, and is the process for deleting information of the target entry from the CAM 110 and the CAMRAM. This process corresponds to step S204 of FIG. 9.

These cycles are executed so as to be shifted by one cycle at every entry. Specifically, when the cycle 1 of the process for an entry 1 is complete, the process for the entry 1 proceeds to the cycle 2, and simultaneously the cycle 1 for an entry 2 is executed. When the pipeline process is executed in such a manner, the process can be completed within one third of the time in a case that the process is executed sequentially.

Figure 11:
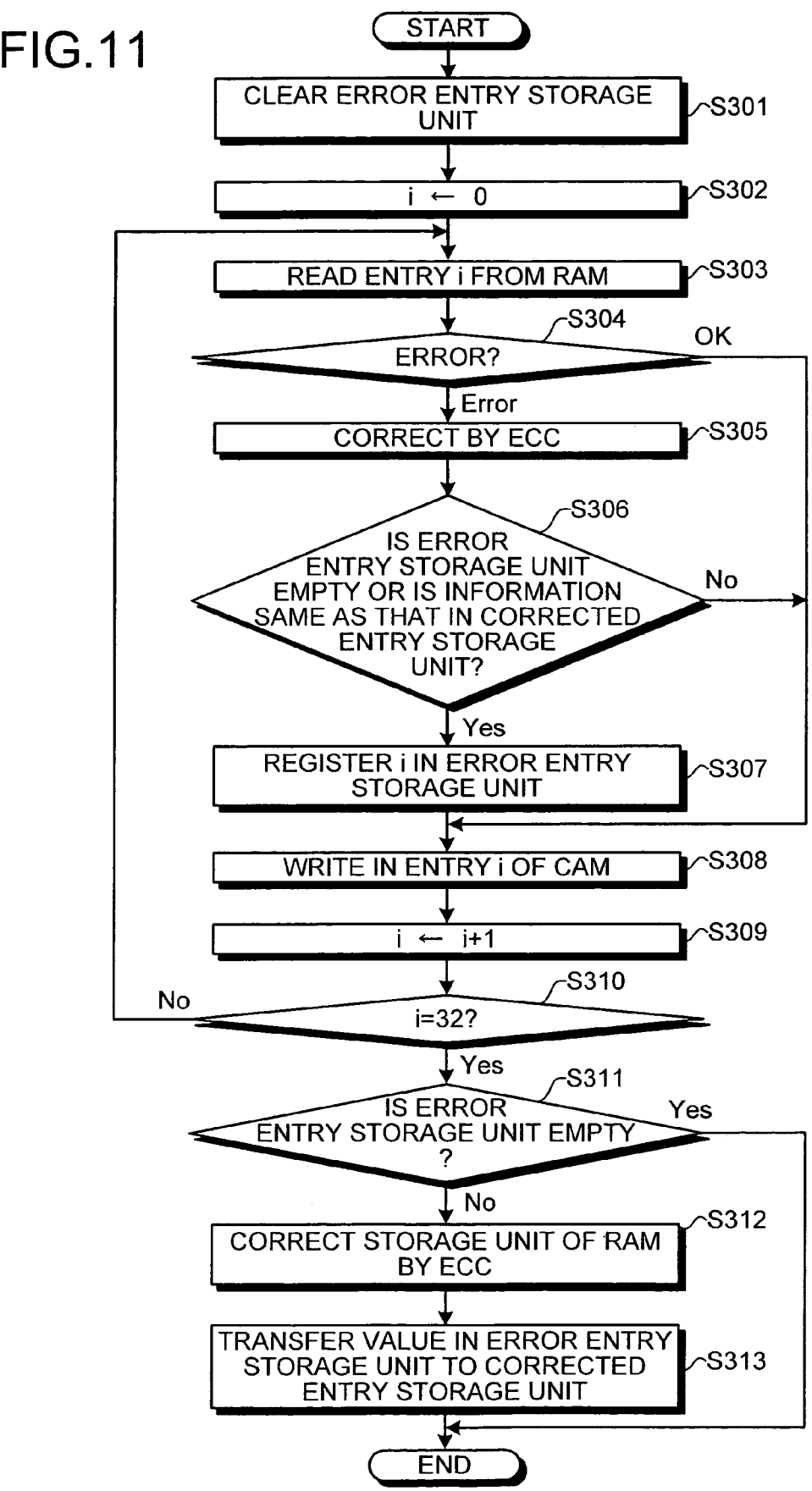
FIG. 11 is a flowchart of a procedure of a swap data transfer process performed by the address conversion buffer controlling apparatus.

A swap data transfer operation is explained below. The swap data transfer operation is a process for transferring CAM data corresponding to a thread to be newly executed, from the CAMRAM to the CAM 110 at the time of switching the thread. FIG. 11 is a flowchart of the procedure of the swap data transfer process performed by the address conversion buffer controlling apparatus 200.

The error entry storage unit 280 is cleared (step S301), and the counter is initialized (step S302). The contents of the entry represented by the counter are read from the CAMRAM area corresponding to the thread to be newly executed (step S303), and it is checked using the ECC bit, whether the read information is garbled.

If garbled data is detected (Error at step S304), the data is corrected using the ECC bit (step S305). If the error entry storage unit 280 has an empty entry or has an entry in which the same entry information as that in the corrected entry storage unit 290 is stored (Yes at step S306), the entry information of CAMRAM in which garbled data is corrected is stored in the entry of the error entry storage unit 280 (step S307).

The data read at step S303 (the data corrected when garbled data is detected) is stored in an entry of the CAM 110 indicated by the counter, no matter how the process is branched at steps S304 and S306 (step S308).

The counter is incremented (step S309), and if the counter is not equal to 32 (No at step S310), the process is repeated from step S303. If the counter is equal to 32 (Yes at step S310), the transfer process ends, and the garbled data in the CAMRAM is corrected in the following manner.

It is checked whether the error entry storage unit 280 is empty. If not empty (No at step S311), the garbled data of the entry in the CAMRAM set in the error entry storage unit 280 is corrected using the ECC bit (step S312), so that the information in the corrected entry is stored in the corrected entry storage unit 290 (step S313). The swap data transfer operation ends here.

FIG. 12 is a time chart for explaining the swap data transferring process.

The address conversion buffer controlling apparatus 200 compares Thread_ID with Thread_ID_1τ (1τ copy signal of Thread_ID), and if they are different from each other, it is determined that the thread has been switched. 4τ after the thread is switched, a CAM_COPY_GO signal for starting the transfer of the swap data from the CAMRAM to the CAM 110 becomes valid.

5τ after the signal becomes valid, Write enable of the entry 0 becomes valid, and information of the entry 0 is transferred. Thereafter, the transfer is carried out at every cycle until an entry 31. After the transfer of all information to the CAM 110 is complete, RAM write access becomes valid, and garbled data of the CAMRAM is corrected.

In this embodiment, the areas for swapping the data on CAM hardly shared among the threads are provided onto the RAM, and CAM data is transferred from the swap area in the RAM to the CAM based on the switching of the thread.

Thus, the processor can be provided with the multithread constitution without increasing the number and the capacity of the CAMs.

According to the present invention, the processor can cope with multithread without increasing the capacity of a first memory area.

Moreover, it is possible to cope with any number of the threads executable on the processor.

Furthermore, the thread switching process can be executed at a high speed.

Moreoever, the reliability of the information in the swap area increases.

Furthermore, it is ensured that the information in the first memory area is correct.

Moreover, data transfer to the memory area is completed at a high speed, and the garbled data in the swap area can be detected and corrected efficiently.

Furthermore, even if a part of the swap area has a fixed failure, garbled data in another part can be corrected properly.

Moreover, if the processor is not in the multithread mode, the second memory area can be utilized effectively.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An address conversion buffer controlling apparatus, constituted on a processor capable of executing a plurality of threads simultaneously on one core, comprising:
    an address conversion buffer that is controlled by the address conversion buffer controlling apparatus, and that includes a first memory area usable by one of the threads and a second memory area shared among all the threads;
    an entry registering unit that registers address conversion information in an entry of the address conversion buffer;
    a swap area control unit that provides control to allocate a part of the second memory area as a swap area of the first memory area; and
    a swap data transferring unit that transfers data in the swap area to the first memory area, based on thread switching executed by the processor, wherein
    the swap area control unit provides control to allocate the swap area in the second memory area for each thread that is simultaneously executable on the processor, and while registering the address conversion information in the first memory area, the entry registering unit also registers the address conversion information in the swap area corresponding to the thread being executed on the processor.

2. The address conversion buffer controlling apparatus according to claim 1, further comprising:
    an error correcting information generating unit that generates error correcting information to allow detection and correction of garbled data of the address conversion information, wherein
    while registering the address conversion information in the swap area, the entry registering unit adds the error correcting information generated to the address conversion information.

3. The address conversion buffer controlling apparatus according to claim 2, wherein
while transferring the data in the swap area to the first memory area, the swap data transferring unit detects and corrects the garbled data using the error correcting information.

4. The address conversion buffer controlling apparatus according to claim 3, further comprising:
    an error entry storage unit that stores storage locations in the swap area corresponding to the address conversion information having garbled data, wherein
    the swap data transferring unit transfers the storage locations into the error entry storage unit, and after transferring all the data in the swap area to the first memory area, the swap data transferring unit corrects the garbled data in the swap area based on the storage locations stored.

5. The address conversion buffer controlling apparatus according to claim 4, wherein
    at the time of transferring the data in the swap area to the first memory area, if the garbled data detected is larger than a capacity of the error entry storage unit, then the swap data transferring unit transfers into the error entry storage unit, at high priority, the storage locations corresponding to the address conversion information of the garbled data not detected at a previous time.

6. The address conversion buffer controlling apparatus according to claim 1, wherein
    the swap area control unit provides control to detect whether the processor is executing the plurality of the threads, and if the processor is not executing the plurality of the threads, the swap area control unit provides control not to allocate the swap area.

7. The address conversion buffer controlling apparatus according to claim 1, further comprising:
    a demapping unit that searches an entry to be demapped, from the information in the first memory area that is considered as master data, and that deletes the entry to be demapped, from both the first memory area and the swap area.

8. The address conversion buffer controlling apparatus according to claim 1, further comprising:
    a demapping unit that searches an entry to be demapped, from the information in the swap area that is considered as master data, and that deletes the entry to be demapped, from both the first memory area and the swap area.

9. The address conversion buffer controlling apparatus according to claim 7, wherein the demapping unit segments the demapping to execute a pipeline process.

10. The address conversion buffer controlling apparatus according to claim 8, wherein the demapping unit segments the demapping to execute a pipeline process.

11. A method for controlling an address conversion buffer, constituted on a processor capable of executing a plurality of threads simultaneously on one core, comprising:
    registering address conversion information in an entry of an address conversion buffer, which is controlled by an address conversion buffer controlling apparatus, and which includes a first memory area usable by one of the threads and a second memory area shared among all the threads;
    allocating a part of the second memory area as a swap area of the first memory area; and
    transferring data in the swap area to the first memory area, based on thread switching executed by the processor, wherein
    the allocating includes allocating the swap area in the second memory area for each thread that is simultaneously executable on the processor, and while registering the address conversion information in the first memory area, the registering also includes registering the address conversion information in the swap area corresponding to the thread being executed on the processor.

12. The method according to claim 11, further comprising:
generating error correcting information to allow detecting and correcting garbled data of the address conversion information, wherein
while registering the address conversion information in the swap area, the registering includes adding the error correcting information generated to the address conversion information.

13. The method according to claim 12, wherein
while transferring the data in the swap area to the first memory area, the transferring includes detecting and correcting the garbled data using the error correcting information.

14. The method according to claim 13, further comprising:
storing in an error entry storage unit, storage locations in the swap area corresponding to the address conversion information having garbled data, wherein
the transferring includes transferring the storage locations into the error entry storage unit, and after transferring all the data in the swap area to the first memory area, the transferring includes correcting the garbled data in the swap area based on the storage locations stored.

15. The method according to claim 14, wherein
at the time of transferring the data in the swap area to the first memory area, if the garbled data detected is larger than a capacity of the error entry storage unit, then the transferring includes transferring into the error entry storage unit, at high priority, the storage locations corresponding to the address conversion information of the garbled data not detected at a previous time.

16. The method according to claim 11, wherein
the allocating includes detecting whether the processor is executing the plurality of the threads, and if the processor is not executing the plurality of the threads, the allocating includes providing control not to allocate the swap area.

17. The method according to claim 11, further comprising:
a demapping including searching an entry to be demapped, from the information in the first memory area that is considered as master data, and deleting the entry to be demapped, from both the first memory area and the swap area.

18. The method according to claim 11, further comprising:
a demapping including searching an entry to be demapped, from the information in the swap area that is considered as master data, and deleting the entry to be demapped, from both the first memory area and the swap area.

19. The method according to claim 17, wherein the demapping is segmented, to execute a pipeline process.

20. The method according to claim 18, wherein the demapping is segmented, to execute a pipeline process.

* * * * *